US010192542B2

(12) United States Patent
Chiang

(10) Patent No.: US 10,192,542 B2
(45) Date of Patent: *Jan. 29, 2019

(54) SPEAKING-RATE NORMALIZED PROSODIC PARAMETER BUILDER, SPEAKING-RATE DEPENDENT PROSODIC MODEL BUILDER, SPEAKING-RATE CONTROLLED PROSODIC-INFORMATION GENERATION DEVICE AND PROSODIC-INFORMATION GENERATION METHOD ABLE TO LEARN DIFFERENT LANGUAGES AND MIMIC VARIOUS SPEAKERS' SPEAKING STYLES

(71) Applicant: National Taipei University, New Taipei (TW)

(72) Inventor: Chen-Yu Chiang, New Taipei (TW)

(73) Assignee: NATIONAL TAIPEI UNIVERSITY, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/337,058

(22) Filed: Oct. 28, 2016

(65) Prior Publication Data

US 2017/0309271 A1 Oct. 26, 2017

(30) Foreign Application Priority Data

Apr. 21, 2016 (TW) .............................. 105112513 A

(51) Int. Cl.
*G10L 13/10* (2013.01)
*G10L 13/033* (2013.01)
(Continued)

(52) U.S. Cl.
CPC .......... *G10L 13/10* (2013.01); *G10L 13/0335* (2013.01); *G10L 13/04* (2013.01); *G10L 15/1807* (2013.01); *G10L 2013/105* (2013.01)

(58) Field of Classification Search
USPC .................................................. 704/257–260
See application file for complete search history.

(56) References Cited

U.S. PATENT DOCUMENTS 7,136,816 B1 * 11/2006 Strom ..................... G10L 13/10
704/260
9,508,338 B1 * 11/2016 Kaszczuk ............... G10L 13/02
(Continued)

OTHER PUBLICATIONS

Chen-Yu Chiang, "A Study on Adaptation of Speaking Rate-Dependent Hierarchical Prosodic Model for Chinese Dialect TTS," Oriental COCOSDA held jointly with 2015 Conference on Asian Spoken Language Research and Evaluation (OCOCOSDA/CASLRE), 2015 International Conference, pp. 42-46.

*Primary Examiner* — Leonard Saint Cyr
(74) *Attorney, Agent, or Firm* — Volpe and Koenig, P.C.

(57) ABSTRACT

A speaking-rate dependent prosodic model builder and a related method are disclosed. The proposed builder includes a first input terminal for receiving a first information of a first language spoken by a first speaker, a second input terminal for receiving a second information of a second language spoken by a second speaker and a functional information unit having a function, wherein the function includes a first plurality of parameters simultaneously relevant to the first language and the second language or a plurality of sub-parameters in a second plurality of parameters relevant to the second language alone, and the functional information unit under a maximum a posteriori condition and based on the first information, the second information and the first plurality of parameters or the plurality of sub-parameters produces speaking-rate dependent reference information and constructs a speaking-rate dependent prosodic model of the second language.

10 Claims, 3 Drawing Sheets

(51) Int. Cl.
G10L 13/04 (2013.01)
G10L 15/18 (2013.01)

(56) References Cited

U.S. PATENT DOCUMENTS

| | | | |
|---|---|---|---|
| 2005/0091274 A1* | 4/2005 | Stanford | G06F 17/30746 |
| 2007/0239439 A1* | 10/2007 | Yi | G10L 13/10 |
| | | | 704/219 |
| 2014/0222421 A1* | 8/2014 | Chen | G10L 13/02 |
| | | | 704/208 |
| 2016/0027452 A1* | 1/2016 | Kalinli-Akbacak | G10L 25/63 |
| | | | 704/240 |
| 2016/0093289 A1* | 3/2016 | Pollet | G10L 13/027 |
| | | | 704/260 |

* cited by examiner

SPEAKING-RATE NORMALIZED PROSODIC PARAMETER BUILDER, SPEAKING-RATE DEPENDENT PROSODIC MODEL BUILDER, SPEAKING-RATE CONTROLLED PROSODIC-INFORMATION GENERATION DEVICE AND PROSODIC-INFORMATION GENERATION METHOD ABLE TO LEARN DIFFERENT LANGUAGES AND MIMIC VARIOUS SPEAKERS' SPEAKING STYLES

CROSS-REFERENCES TO RELATED APPLICATIONS

The application claims the benefit of Taiwan Patent Application No. 105112513, filed on Apr. 21, 2016, at the Taiwan Intellectual Property Office, the disclosures of which are incorporated herein in their entirety by reference.

FIELD OF THE INVENTION

The present invention relates to a device and a method for use in speech synthesis apparatus. In particular, it relates to a speaking-rate normalized prosodic parameter builder, a speaking-rate dependent prosodic model builder, a speaking-rate controlled prosodic-information generation device and a prosodic-information generation method able to learn different languages and mimic various speakers' speaking styles.

BACKGROUND OF THE INVENTION

There are many documents reporting methods for building a prosodic model of a Chinese text-to-speech system. In the prior art, methods related to using the prosodic model of a Chinese text-to-speech system can be divided into five groups of methods: the first group of methods is employed for the prosodic model, which is directly created via an existing prosodic model or an pattern recognition tool; the second group of methods is employed for speech conversion between one language and its sub-dialects; the third group of methods is employed for finding the correspondence between tones and basic syllable types of two languages; the fourth group of methods is employed for transposing a speaker with an average voice in an HMM-based speech synthesis system (HTS); and the fifth group of methods is employed for a speaking-rate controlled prosodic-information generation device and a speaking-rate dependent hierarchical prosodic model.

The first group of methods does not have enough training data and does not have a systematic framework or model to establish various dialects of Chinese.

The second kind of methods applies only in the conversion between one language and its sub-dialects, and is not applicable for the conversion among the seven dialects of Chinese.

The third group of methods does not refine the prosodic model across languages and across speakers. Therefore, the estimation of the prosody in this group of methods is still limited.

The fourth group of methods does not have a scheme with speaking-rate controlled prosodic parameters as proposed in the present invention.

The fifth group of methods can only be used for learning a single language from a single speaker.

Keeping the drawbacks of the prior art in mind, and persistently employing experiments and research, the applicant has finally conceived of a speaking-rate normalized prosodic parameter builder, a speaking-rate dependent prosodic model builder, a speaking-rate controlled prosodic-information generation device and a prosodic-information generation method able to learn different languages and mimic various speakers' speaking styles.

SUMMARY OF THE INVENTION

It is a primary objective of the present invention to employ a speaking-rate controlled prosodic information generation unit trained by a speech corpus having a large amount of language material of language A originating from a first speaker, as a basis, and to use an adaptive processing technique to combine similar or common characteristics of language and prosody of language A and of language B to accomplish the build-up of a speaking-rate controlled prosodic information generation device and a method for generating language characteristics and speaking style of a second speaker under the condition that only a small amount of speech material of language B of the speaker B is collected.

According to the first aspect of the present invention, a prosodic-information generation device comprises a first prosodic-information generation unit generating a first statistic datum, a first speaking-rate normalized prosodic parameter model, a second statistic datum and a first speaking-rate dependent prosodic model of a first language, based on a first information originating from the first language spoken by a first speaker, a second prosodic-information generation unit providing a first functional information unit and a second functional information unit, and generating a second speaking-rate normalized prosodic parameter model and a second speaking-rate dependent prosodic model based on the first statistic datum, the first speaking-rate normalized prosodic parameter model, the second statistic datum, the first speaking-rate dependent prosodic model and a second information originating from a second language spoken by a second speaker, wherein the first functional information unit has a first function including a likelihood function, generates a first plurality of parameters capable of joining a speaking-rate normalization of a pitch contour, a syllable duration and/or a pause duration of the second language based on the second information, the first statistic datum and the first speaking-rate normalized prosodic parameter model, and constructs the second speaking-rate normalized prosodic parameter model of the second language according to the first plurality of parameters, where the first function uses a Maximum a Posteriori Linear Regression (MAPLR) algorithm to estimate the first plurality of parameters, and the likelihood function is used to relate among a pitch contour, a syllable duration and/or a pause duration of the first language and those of the second language, and the second functional information unit has a second function including one of a second plurality of parameters simultaneously relate to the first language and the second language, and a plurality of sub-parameters of any one in a third plurality of parameters relevant to the second language alone, in which the first functional information unit, under a maximum a posteriori (MAP) condition, based on the first information, the second information and one of the second plurality of parameters and the plurality of sub-parameters, produces a speaking-rate dependent reference information so as to construct the second speaking-rate dependent prosodic model of the second language according to the reference information, and a prosodic-information generator generating a first prosodic parameter of a second language content based on the second speaking-rate normalized prosodic parameter model, the second speaking-rate dependent prosodic model, a desired speaking-rate to synthesize a second language speech, and the second language content desired to be synthesized.

According to the second aspect of the present invention, a prosodic-information generation method comprises steps of: providing a first information originating from a first language spoken by a first speaker and a second information originating from a second language spoken by a second speaker; generating a first statistic datum, a first speaking-rate normalized prosodic parameter model, a second statistic datum and a first speaking-rate dependent prosodic model based on the first information; providing a first functional information unit, wherein the first functional information unit has a first function including a likelihood function, generates a first plurality of parameters joining a speaking-rate normalization of a pitch contour, a syllable duration and/or a pause duration of the second language based on the second information, the first statistic datum and the first speaking-rate normalized prosodic parameter model and constructs the second speaking-rate normalized prosodic parameter model of the second language according to the first plurality of parameters, where the first function uses a Maximum a Posteriori Linear Regression (MAPLR) algorithm to estimate the first plurality of parameters, and the likelihood function relates among a pitch contour, a syllable duration and/or a pause duration of the first language and those of the second language; providing a second functional information unit which has a second function including one of a second plurality of parameters simultaneously relate to the first language and the second language, and a plurality of sub-parameters of any one in a third plurality of parameters relevant to the second language alone, wherein the first functional information unit, under a maximum a posteriori (MAP) condition, based on the first information, the second information and one of the second plurality of parameters and the plurality of sub-parameters, produces a speaking-rate dependent reference information so as to construct the second speaking-rate dependent prosodic model of the second language according to the reference information; and generating a first prosodic parameter of a second language content based on the second speaking-rate normalized prosodic parameter model, the second speaking-rate dependent prosodic model, a desired speaking-rate to synthesize a second language speech and the second language content desired to be synthesized.

According to the third aspect of the present invention, a speaking-rate normalized prosodic parameter builder comprises a first input terminal for receiving a first information originating from a first language spoken by a first speaker, a second input terminal for receiving a second information originating from a second language spoken by a second speaker, and a functional information unit having a function, generating, based on the first information and the second information, a first plurality of parameters joining a speaking-rate normalization of a pitch contour, a syllable duration and/or a pause duration of the second language, and constructing a speaking-rate normalized prosodic parameter model of the second language according to the first plurality of parameters, where the function includes a likelihood function and uses a Maximum a Posteriori Linear Regression (MAPLR) algorithm, and the likelihood function relates among a pitch contour, a syllable duration and/or a pause duration of the first language and those of the second language.

According to the fourth aspect of the present invention, a speaking-rate dependent prosodic model builder comprises a first input terminal for receiving a first information originating from a first language spoken by a first speaker, a second input terminal for receiving a second information originating from a second language spoken by a second speaker, and a functional information unit having a function, wherein the function includes one of a first plurality of parameters simultaneously relevant to the first language and the second language, and a plurality of sub-parameters of any one in a second plurality of parameters relevant to the second language alone, and the functional information unit, under a maximum a posteriori (MAP) condition, based on the first information, the second information and one of the first plurality of parameters and the plurality of sub-parameters, produces a speaking-rate dependent reference information, and constructs a speaking-rate dependent prosodic model of the second language according to the reference information.

The present invention can be best understood through the following descriptions with reference to the accompanying drawings, in which:

DETAILED DESCRIPTION OF THE PREFERRED EMBODIMENT

Although the following description contains many specifications for the purposes of illustration, anyone of ordinary skill in the art will appreciate that many variations and alterations to the following details are within the scope of the invention. Accordingly, the following preferred embodiment of the invention is set forth without any loss of generality to and without imposing limitations upon, the claimed invention.

Figure 1:
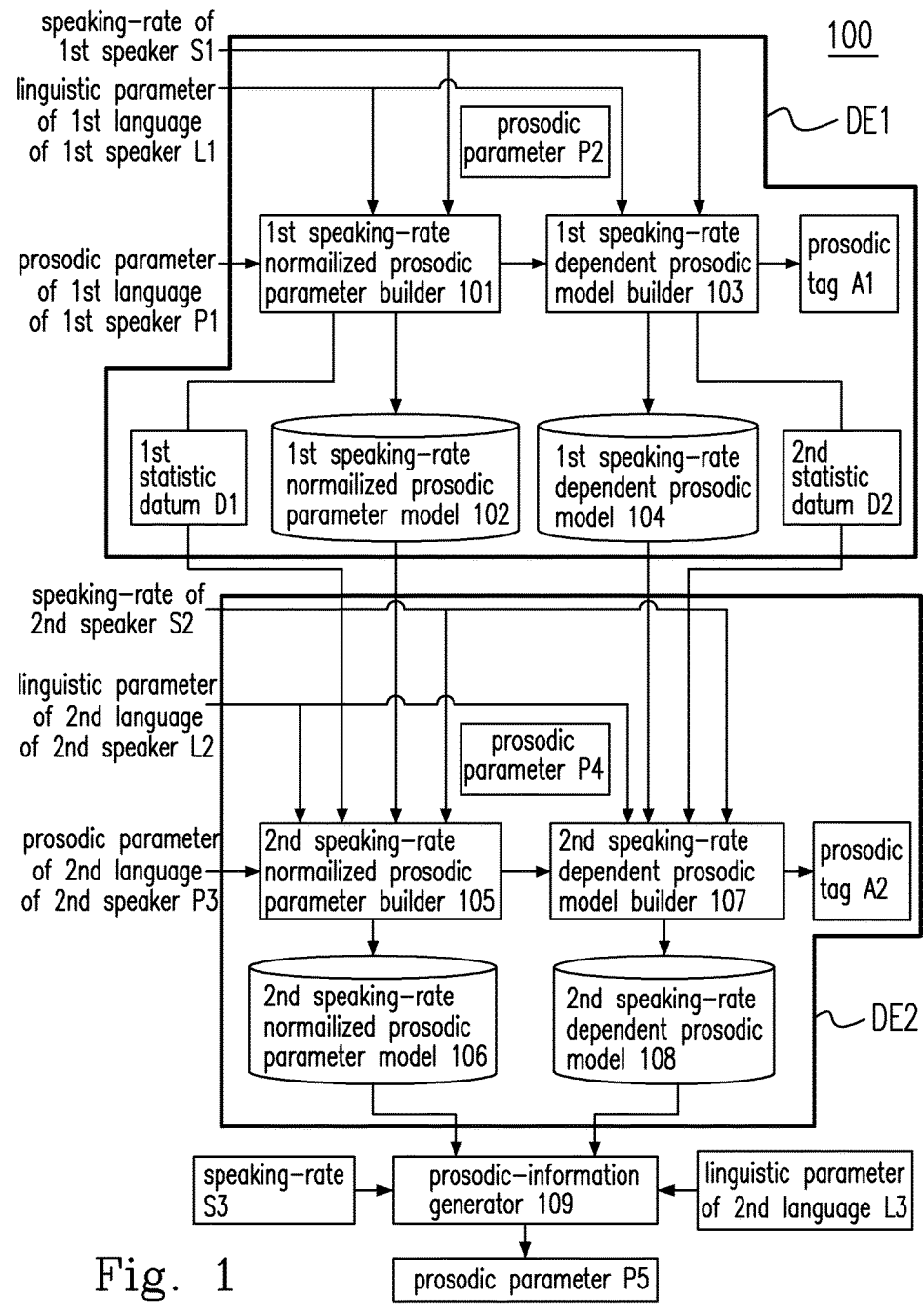
FIG. 1 shows a schematic diagram of a prosodic information generation device 100 according to a preferred embodiment of the present invention.

For the purpose of this invention, a speaking-rate controlled prosodic-information generation device and a method thereof are disclosed, as shown in FIG. 1. The prosodic-information generation device 100 includes a first prosodic-information generation unit DE1, a second prosodic-information generation unit DE2 and a prosodic-information generator 109, wherein the first prosodic-information generation unit DE1 includes a first speaking-rate normalized prosodic parameter builder 101, a first speaking-rate normalized prosodic parameter model 102, a first speaking-rate dependent prosodic model builder 103, and a first speaking-rate dependent prosodic model 104, the second prosodic-information generation unit DE2 includes a second speaking-rate normalized prosodic parameter builder 105, a second speaking-rate normalized prosodic parameter model 106, a second speaking-rate dependent prosodic model builder 107, a second speaking-rate dependent prosodic model 108, and the second speaking-rate normalized prosodic parameter builder 105 and the second speaking-rate dependent prosodic model builder 107 respectively include a first function datum unit and a second function datum unit, wherein the first function datum unit and the second function datum unit respectively have a first function and a second function.

When the prosodic-information generator 109 generates a first prosodic parameter P5 of a second language content based on the second speaking-rate normalized prosodic parameter model 106, the second speaking-rate dependent prosodic model 108, a desired speaking-rate S3 to synthesize a second language speech, and the second language content desired to synthesize, and the first prosodic parameter P5 includes a syllable pitch contour, a syllable duration, a syllable energy level and an inter-syllable pause duration of the second language, and has prosodic characteristics of imitating the second language, the speaking style and the different speaking-rates of the second speaker. Thus, the prosodic-information generation device 100 is able to use any speech synthesizer to synthesize a synthesized speech signal having a transfer capability among different languages, any designated speaking-rate, and speaking style of different speakers according to a first prosodic parameter P5.

In more detail, when a first speaking-rate S1 of the first language originating from the first speaker, a first linguistic parameter L1 and a second prosodic parameter P1 are input to the first speaking-rate normalized prosodic parameter builder 101, a function of the first speaking-rate S1 versus the second prosodic parameter P1 under the condition of the linguistic parameters of the first language of the first speaker will be built up, and this function is used to remove the influence of the first speaking-rate S1 towards the second prosodic parameter P1, to accomplish the speaking-rate normalization, to obtain a fourth prosodic parameter P2 with a normalized speaking-rate of the speaker and a first statistic datum D1 and to output this function simultaneously as a first speaking-rate normalized prosodic parameter model 102, wherein the fourth prosodic parameter P2 includes a speaking-rate normalized syllable pitch contour, a syllable duration, a syllable energy level and an inter-syllable pause duration of the first language, and the first linguistic parameter L1 includes parts of speech, punctuation marks, a word length, a tone, basic syllable types and types of vowels of the first language.

The first speaking-rate normalized prosodic parameter model 102 is used to describe a relationship between a speaking-rate of a sentence and a first-order statistic (e.g., a mean) and/or a second-order statistic (e.g., a variance) of a prosodic parameter, and the relationship can be used to estimate the first-order statistic or second-order statistic of the prosodic parameter of the sentence via the speaking-rate of the sentence. After the statistics above are obtained, a prosodic parameter under a certain speaking-rate can use a z-score normalization to accomplish the removal of the influence of the speaking-rate on the prosodic parameter. In addition, the model 102 is later used as a reference model for learning an influence of a second speaking-rate S2 of a second speaker towards a third prosodic parameter P3 of a second language of the second speaker, that is to say it is used as an initial model estimating the second speaking-rate normalized prosodic parameter model 106 of the second language such that the second speaking-rate normalized prosodic parameter builder 105 of the second language can estimate the second speaking-rate normalized prosodic parameter model 106 more accurately.

In addition, the second prosodic parameter P1 includes a syllable pitch contour, a syllable duration, and an inter-syllable pause duration, wherein the speaking-rate normalization of the syllable pitch contour is the speaking-rate normalization considering the first-order and second-order statistics under the circumstances of different tones, the syllable duration is the normalization of the speaking-rate considering the second-order statistic, and the inter-syllable pause duration is the normalization of the speaking-rate considering the first-order and second-order statistics.

Via the fourth prosodic parameter P2, the first speaking rate S1 and the first linguistic parameter L1 are further input to the first speaking-rate dependent prosodic model builder 103, the fourth prosodic parameter P2 is analyzed as a prosodic structure indicated by the first prosodic tag A1, and generates a second statistic datum D2 and the first speaking-rate dependent prosodic model 104 at the same time, wherein the first speaking-rate dependent prosodic model 104 is used to describe the prosodic hierarchical structure of the speech of the first language, and is used to generate the prosodic parameter for the speech synthesizer. The first speaking-rate dependent prosodic model 104 includes plural sub-models, and the sub-models are a break-syntax model, a prosodic state model, a prosodic state-syntax model, a syllable prosodic-acoustic model, a syllable juncture prosodic-acoustic model. The first prosodic tag A1 includes a sequence of prosodic break tags of the first language of the first speaker, a sequence of a syllable pitch prosodic state, a sequence of syllable duration prosodic state, and a sequence of syllable energy prosodic state. For example, in another preferred example of the present invention, the first speaking-rate dependent prosodic model 104 of the prosodic-information generation device 100 is a speaking rate (SR)-dependent hierarchical prosodic model (SR-HPM). In which, the break-syntax model is an SR-dependent break-syntax model: $P(B|L,x,\lambda_B)$, and this model is used to predict the prosodic structure in terms of break type sequence, B, given with linguistic parameter, L, speaking rate, x, and the model parameter $\lambda_B$. The prosodic state model is an SR-dependent prosodic state model: $P(P|B,x,\lambda_P)$, and this model is used to predict prosodic state sequence, P={p,q,r}, given with the prosodic structure in term of break type, B, speaking rate, x, and the model parameter $\lambda_P$; where p, q, and r respectively represent sequences of pitch prosodic state, duration prosodic state, and energy prosodic state. It is noted that the sequences of the prosodic states represent the global prosody patterns of syllable pitch contour (p), syllable duration (q), and syllable energy level (r), resulted from an aggregation of prosodic word (PW), prosodic phrase (PPh), and breath group or prosodic phrase group (BG/PG). The prosodic state-syntax model is a prosodic state-syntax model: $P(P|L,\lambda_{PL})$, and this model is used to assist in predicting prosodic state sequence, P, given with linguistic parameter L, and the model parameter $\lambda_{PL}$. The syllable prosodic-acoustic model: $P(X|B,P,L,\lambda_X)$ is used to generate SR-normalized syllable prosodic parameters (X) of syllable pitch contour (sp'), syllable duration (sd'), and syllable energy level (se'), given with the prosodic break sequence (B), the prosodic state (P), linguistic parameter (L), and the model parameter $\lambda_X$. The syllable juncture prosodic-acoustic model: $P(Y,Z|B,L,\lambda_{YZ})$ describes the inter-syllable acoustic characteristics, {Y, Z}, conditioning on break type, B, and linguistic parameter, L, given the model parameter $\lambda_{YZ}$; where Y={pd, ed} is the syllable juncture prosodic parameter; Z={pj, dl, df} is the inter-syllable differential prosodic parameter; pd, ed, pj, dl, and df, correspondingly stand for inter-syllable pause duration, inter-syllable energy dip level, inter-syllable pitch jump, and the two duration lengthening factors. In the prosody generation, this model is used to predict the SR-normalized inter-syllable pause duration, pd'.

The main use of the first speaking-rate dependent prosodic model 104 is to serve as another initial model estimating the second speaking-rate dependent prosodic model 108 of the second language, its principle is to employ similar or common characteristics of language and prosody of different speakers and languages such that the second speaking-rate dependent prosodic model builder 107 can estimate the parameters of the second speaking-rate dependent prosodic model 108 more accurately so as to accomplish the build-up of the second speaking-rate dependent prosodic model 108 to generate language characteristics and speaking style of a second speaker when only a small amount of speech material of the second language of the second speaker is collected.

Then, when the second speaking-rate normalized prosodic parameter builder 105 receives a second speaking-rate S2 originating from the second language spoken by the second speaker, a second linguistic parameter L2, the third prosodic parameter model P3, the first statistic datum D1 and the first speaking-rate normalized prosodic model 102 to remove an influence of the second speaking-rate S2 on a first-order and a second-order statistical characteristics of the third prosodic parameter P3 so as to generate a fifth prosodic parameter P4 based on the information above and the first functional information unit having a first function including a likelihood function. Meanwhile, under the circumstances of employing similar or common characteristics between the first language and the second language and of receiving small amount of information samples above to generate the second speaking-rate normalized prosodic parameter model 106 use a maximum a posteriori estimation (MAPE) method, wherein the second linguistic parameter L2 includes parts of speech, punctuation marks, a word length, a tone, basic syllable types and types of vowel of the second language, the third prosodic parameter P3 includes a syllable pitch contour, a syllable duration, a syllable energy level and an inter-syllable pause duration of the second language, and the fifth prosodic parameter P4 includes a speaking-rate normalized syllable pitch contour, a syllable duration, a syllable energy level and an inter-syllable pause duration of the second language.

The second speaking-rate normalized prosodic parameter model 106 is used to provide a functional relationship between a third speaking-rate S3 of a speech of the second language desired to synthesize versus the speaking-rate dependent first prosodic parameter P5 of the speech in the prosodic information generator 109, and causes the first prosodic parameter P5 to meet the statistical characteristics of the first-order and the second-order prosodic parameters under the circumstances of the third speaking-rate S3.

When the second speaking-rate dependent prosodic model builder 107 receives the fifth prosodic parameter P4, the second linguistic parameter L2, the second speaking-rate S2 and the first speaking-rate dependent prosodic model 104, based on the information received above and the second function datum unit including the second function, under the circumstances of employing similar or common characteristics between the first language and the second language, and of receiving a small amount of information samples above using an MAPE method and a specially designed iterative algorithm to generate the second speaking-rate dependent prosodic model 108 and the second prosodic tag A2, the second prosodic tag datum A2 includes a sequence of prosodic break tags of the second language of the second speaker, a sequence of a syllable pitch prosodic state, a sequence of syllable duration prosodic state, and a sequence of syllable energy prosodic state.

The second speaking-rate dependent prosodic model 108 provides the prosodic information generator 109 with plural sub-models, and the plural sub-models include multiple prosodic models: a break-syntax model, a prosodic state model, a prosodic state-syntax model, a syllable prosodic-acoustic model, a syllable juncture prosodic-acoustic model and so on such that the prosodic information generator 109 can generate prosodic parameters imitating the language characteristics, the speaking style and various speaking-rates of the second speaker.

In addition, the second language content desired to synthesize is a third linguistic parameter L3 of the second language of the second language speech. The third linguistic parameter L3 of the second language includes parts of speech, punctuation marks, a word length, a tone, basic syllable types and types of vowels of the second language. The first language and the second language are both related to Chinese, and are one selected from a group consisting of Mandarin, Wu, Yue (Cantonese), Minnan (Hokkien), Xiang, Hakka and Gan.

In another embodiment, the first language and the second language can be related to the languages of the Sino-Tibetan language family, the Altaic language family, the Austro-Asiatic language family, the Austronesian language family, the Indo-European language family, and the Afro-Asiatic Family.

Figure 2:
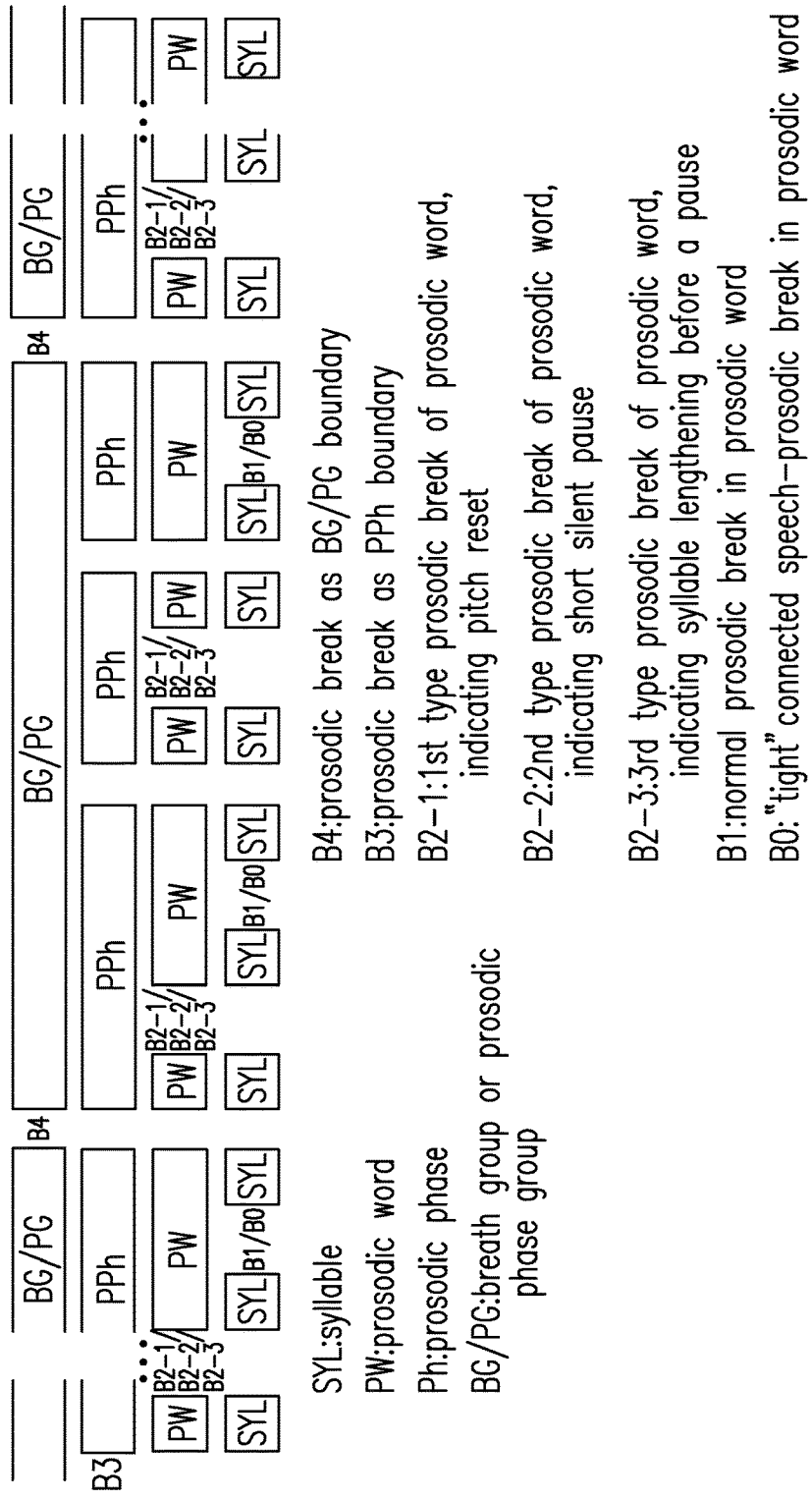
FIG. 2 shows a schematic diagram of a hierarchical prosodic structure for Chinese speech according to a preferred embodiment of the present invention.

FIG. 2 is a schematic diagram of a hierarchical prosodic structure for Chinese speech according to a preferred embodiment of the present invention. It shows that this language prosodic structure includes four prosodic components: syllable, prosodic word, prosodic phrase and breath group or prosodic phrase group.

Figure 3:
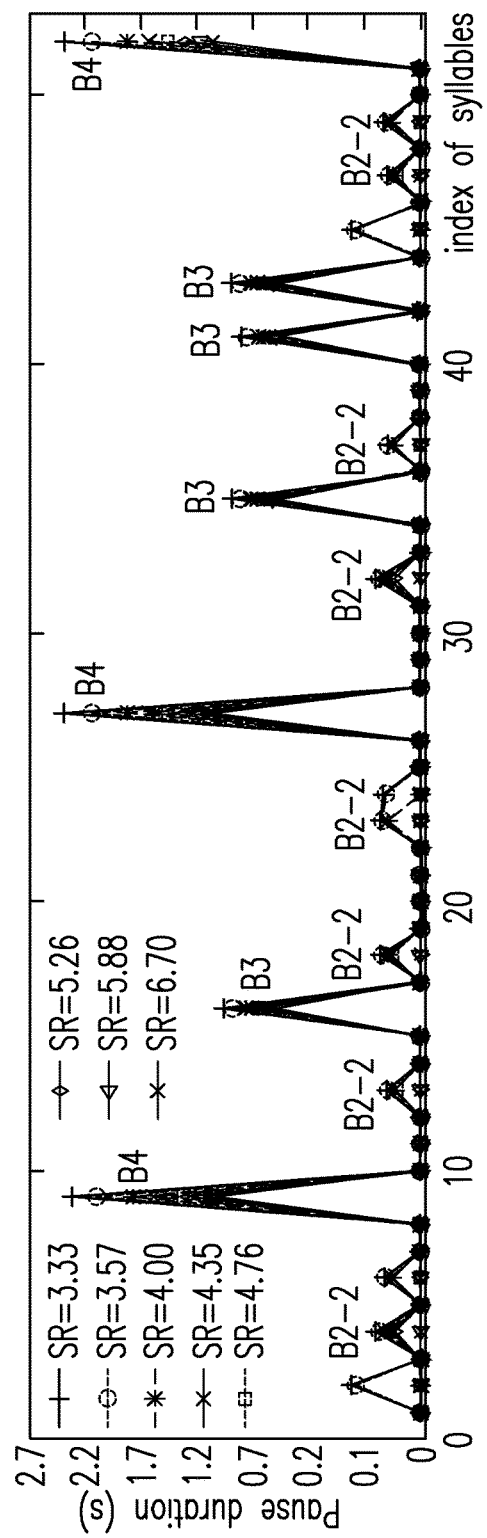
FIG. 3 shows a schematic diagram of prosodic breaks and the corresponding inter-syllable pause durations produced by the speaking-rate controlled prosodic-information generation device 100 according to a preferred embodiment of the present invention.

FIG. 3 is a schematic diagram of prosodic breaks and the corresponding inter-syllable pause durations produced by speaking-rate controlled prosodic-information generation device 100 according to a preferred embodiment of the present invention. FIG. 3 is an example of the break type prediction and the pause durations for 8 different SR synthesized utterances. As shown in FIG. 3, it can be seen that the synthesized utterances in extrapolated slower SRs (e.g. 3.3 and 3.6 syl/sec) are more likely to be characterized by a short-pause break type (B2-2) than the utterances in fast SRs (e.g. 4.8-6.7 syl/sec) were. In addition, longer pause durations were observed for the utterances with slower SRs at syllable junctures labeled with the pause-related break types (B2-2, B3, and B4).

EMBODIMENTS

1. A prosodic-information generation device, comprising:
a first prosodic-information generation unit generating a first statistic datum, a first speaking-rate normalized prosodic parameter model, a second statistic datum and a first speaking-rate dependent prosodic model of a first language, based on a first information originating from the first language spoken by a first speaker;
a second prosodic-information generation unit providing a first functional information unit and a second functional information unit, and generating a second speaking-rate normalized prosodic parameter model and a second speaking-rate dependent prosodic model based on the first statistic datum, the first speaking-rate normalized prosodic parameter model, the second statistic datum, the first speaking-rate dependent prosodic model and a second information originating from a second language spoken by a second speaker, wherein:
the first functional information unit has a first function including a likelihood function, generates a first plurality of parameters capable of joining a speaking-rate normalization of a pitch contour, a syllable duration and/or a pause duration of the second language based on the second information, the first statistic datum and the first speaking-rate normalized prosodic parameter model, and constructs the second speaking-rate normalized prosodic parameter model of the second language according to the first plurality of parameters, where the first function uses a Maximum a Posteriori Linear Regression (MAPLR) algorithm to estimate the first plurality of parameters, and the likelihood function is used to relate among a pitch contour, a syllable duration and/or a pause duration of the first language and those of the second language; and the second functional information unit has a second function including one of a second plurality of parameters simultaneously relate to the first language and the second language, and a plurality of sub-parameters of any one in a third plurality of parameters relevant to the second language alone, in which the first functional information unit, under a maximum a posteriori (MAP) condition, based on the first information, the second information and one of the second plurality of parameters and the plurality of sub-parameters, produces a speaking-rate dependent reference information so as to construct the second speaking-rate dependent prosodic model of the second language according to the reference information; and a prosodic-information generator generating a first prosodic parameter of a second language content based on the second speaking-rate normalized prosodic parameter model, the second speaking-rate dependent prosodic model, a desired speaking-rate to synthesize a second language speech, and the second language content desired to be synthesized.

2. The prosodic-information generation device according to Embodiment 1, wherein:

the first language and the second language are both related to Chinese, and are one selected from a group consisting of Mandarin, Wu, Yue, Minnan, Xiang, Hakka and Gan;

the prosodic-information generation device achieves to learns the second language from the first language, mimics a speaking style of the second speaker based on a speaking style of the first speaker and controls the desired speaking-rate according to the first function and the second function;

the prosodic-information generation device uses any one of speech synthesizers to synthesize a synthesized speech signal having a transfer capability among different languages, any one of designated speaking-rates, and speaking styles of different speakers;

the first information includes a first speaking-rate of the first language, a first linguistic parameter and a second prosodic parameter;

the second information includes a second speaking-rate of the second language, a second linguistic parameter and a third prosodic parameter;

the second language content desired to be synthesized is a third linguistic parameter of the second language of the second language speech;

the first prosodic-information generation unit executes one of an N-fold sampling algorithm and a decision tree algorithm related to a training sample estimation, based on the first information so as to generate the first statistic datum and the second statistic datum;

the first statistic datum includes a first statistic and a second statistic, wherein the first statistic and the second statistic respectively represent a first mean and a first variance of a tone of the first language;

the second statistic datum includes a third statistic and a fourth statistic, wherein the third statistic and the four statistic respectively represent a second mean and a second variance of a tone dependent on a speaking-rate of the first language; and the second plurality of parameters and the third plurality of parameters include the parameters of a break-syntax model, a prosodic state model, a prosodic state-syntax model, a syllable prosodic-acoustic model, a syllable juncture prosodic-acoustic model, and the plurality of sub-parameters include several additive factors related to tone, basic syllable type, initial type, coarticulation and prosodic states, wherein plural variances of the plurality of sub-parameters are obtained by executing one of the N-fold sampling algorithm and the decision tree algorithm related to the training sample estimation.

3. The prosodic-information generation device according to Embodiment 1 or 2, wherein:

the first prosodic-information generation unit further includes a first speaking-rate normalized prosodic parameter builder generating a fourth prosodic parameter, the first statistic datum and the first speaking-rate normalized prosodic parameter model based on the first speaking-rate, the first linguistic parameter and the second prosodic parameter and a first speaking-rate dependent prosodic model builder generating a first prosodic tag, the second statistic datum and the first speaking-rate dependent prosodic model based on the first speaking-rate, the first linguistic parameter and the fourth prosodic parameter;

the second prosodic-information generation unit further includes a second speaking-rate normalized prosodic parameter builder and a second speaking-rate dependent prosodic model builder, wherein the second speaking-rate normalized prosodic parameter builder includes the first functional information unit and the second speaking-rate dependent prosodic model builder includes the second functional information unit;

when a first specific condition is met, the first function uses the MAPLR algorithm to generate the first plurality of parameters for joining a speaking-rate normalization of the pitch contour, the syllable duration and/or the pause duration of the second language, and to remove a first-order and a second-order statistical characteristics of the third prosodic parameter influenced by the second speaking-rate so as to generate a fifth prosodic parameter;

the second speaking-rate normalized prosodic parameter model includes a syllable pitch contour normalized model, a syllable duration normalized model and a pause duration-speaking-rate normalization model originating from the second language spoken by the second speaker, wherein those models respectively remove statistical characteristics in the pitch contour, the syllable duration and the inter-syllable pause duration of the second language influenced by the second speaking-rate;

when the first specific condition is met, the second function uses a MAP condition to generate a speaking-rate dependent reference information based on the first information, the second information, and one of the second plurality of parameters and the plurality of sub-parameters, constructs the second speaking-rate dependent prosodic model and generates a second prosodic tag according to the reference information;

either of the first speaking-rate dependent prosodic model and the second speaking-rate dependent prosodic model includes a break-syntax model, a prosodic state model, a prosodic state-syntax model, a syllable prosodic-acoustic model, a syllable juncture prosodic-acoustic model of the first language and the second language, wherein the break-syntax model and the prosodic state model are related to a speaking-rate; and the first specific condition includes:
a range of the first speaking-rate of the first language is larger than a range of the second speaking-rate of the second language; and
an amount of parameters of the first linguistic parameter and an amount of parameters of the second prosodic parameter are respectively larger than an amount of parameters of the second linguistic parameter and an amount of parameters of the third prosodic parameter.

4. The prosodic-information generation device according to any one of the above-mentioned Embodiments, wherein:
the second speaking-rate dependent prosodic model is generated in the range of the second speaking-rate of the second speaker, and is extrapolated out of the range of the second speaking-rate of the second speaker to a prosodic break in language, a prosodic state and a first-order and a second-order statistical characteristics of a speaking-rate normalized prosodic parameter influenced by a speaking-rate, for enabling the prosodic-information generation device to generate the first prosodic parameter having speaking-rate characteristics of the second language speech;
the prosodic break in language has a prosodic structure corresponding to a speaking style of the second speaker at a specific speaking-rate;
a sequence of the prosodic state represents syllable prosodic acoustic characteristics of a prosodic constituent of a upper level corresponding to the speaking style of the second speaker under the generated prosodic structure and a specific speaking-rate; and
the speaking-rate normalized prosodic parameter represents a prosodic parameter having characteristics of the second speaker under a designated speaking-rate and having speaking style of the second speaker.

5. A prosodic-information generation device according to any one of the above-mentioned Embodiments, wherein:
the first linguistic parameter includes parts of speech, punctuation marks, a word length, a tone, basic syllable types and types of vowel of the first language;
the second linguistic parameter includes parts of speech, punctuation marks, a word length, a tone, basic syllable types and types of vowel of the second language;
the third linguistic parameter includes parts of speech, punctuation marks, a word length, a tone, basic syllable types and types of vowel of the second language;
the first prosodic parameter includes a syllable pitch contour, the syllable duration, a syllable energy level and the pause duration between two syllables of the second language;
the second prosodic parameter includes a syllable pitch contour, the syllable duration, a syllable energy level and the pause duration between two syllables of the first language;
the third prosodic parameter includes the syllable pitch contour, the syllable duration, the syllable energy level and the inter-syllable pause duration of the second language;
the fourth prosodic parameter includes the speaking-rate normalized syllable pitch contour, the syllable duration, the syllable energy level and the inter-syllable pause duration of the first language;
the fifth prosodic parameter includes the speaking-rate normalized syllable pitch contour, the syllable duration, the syllable energy level and the inter-syllable pause duration of the second language;
a first prosodic tag datum includes a sequence of prosodic break tags of the first language of the first speaker, a sequence of a syllable pitch prosodic state, a sequence of syllable duration prosodic state, and a sequence of syllable energy prosodic state; and
a second prosodic tag datum includes a sequence of prosodic break tags of the second language of the second speaker, a sequence of a syllable pitch prosodic state, a sequence of syllable duration prosodic state, and a sequence of syllable energy prosodic state.

6. A prosodic-information generation method, comprising steps of:
providing a first information originating from a first language spoken by a first speaker and a second information originating from a second language spoken by a second speaker;
generating a first statistic datum, a first speaking-rate normalized prosodic parameter model, a second statistic datum and a first speaking-rate dependent prosodic model based on the first information;
providing a first functional information unit, wherein the first functional information unit has a first function including a likelihood function, generates a first plurality of parameters joining a speaking-rate normalization of a pitch contour, a syllable duration and/or a pause duration of the second language based on the second information, the first statistic datum and the first speaking-rate normalized prosodic parameter model and constructs the second speaking-rate normalized prosodic parameter model of the second language according to the first plurality of parameters, where the first function uses a Maximum a Posteriori Linear Regression (MAPLR) algorithm to estimate the first plurality of parameters, and the likelihood function relates among a pitch contour, a syllable duration and/or a pause duration of the first language and those of the second language;
providing a second functional information unit which has a second function including one of a second plurality of parameters simultaneously relate to the first language and the second language, and a plurality of sub-parameters of any one in a third plurality of parameters relevant to the second language alone, wherein the first functional information unit, under a maximum a posteriori (MAP) condition, based on the first information, the second information and one of the second plurality of parameters and the plurality of sub-parameters, produces a speaking-rate dependent reference information so as to construct the second speaking-rate dependent prosodic model of the second language according to the reference information; and
generating a first prosodic parameter of a second language content based on the second speaking-rate normalized prosodic parameter model, the second speaking-rate dependent prosodic model, a desired speaking-rate to synthesize a second language speech and the second language content desired to be synthesized.

7. A speaking-rate normalized prosodic parameter builder, comprising:
a first input terminal for receiving a first information originating from a first language spoken by a first speaker;
a second input terminal for receiving a second information originating from a second language spoken by a second speaker, and
a functional information unit having a function, generating, based on the first information and the second information, a first plurality of parameters joining a speaking-rate normalization of a pitch contour, a syllable duration and/or a pause duration of the second language, and constructing a speaking-rate normalized prosodic parameter model of the second language according to the first plurality of parameters, where the function includes a likelihood function and uses a Maximum a Posteriori Linear Regression (MAPLR) algorithm, and the likelihood function relates among a pitch contour, a syllable duration and/or a pause duration of the first language and those of the second language.

8. The speaking-rate normalized prosodic parameter builder according to Embodiment 7, wherein:

the first language and the second language are both related to Chinese, and are one selected from a group consisting of Mandarin, Wu, Yue, Minnan, Xiang, Hakka and Gan;

the first information includes a first statistic datum and a speaking-rate normalized prosodic parameter model generated based on a first speaking-rate, a first linguistic parameter and a first prosodic parameter of the first language; and the second information represents a second speaking-rate of the second language spoken by the second speaker, a second linguistic parameter and a second prosodic parameter.

9. The speaking-rate normalized prosodic parameter builder according to Embodiment 7 or 8 being configured in a prosodic-information generation device, wherein the prosodic-information generation device further includes a first prosodic-information generation unit, a second prosodic-information generation unit, a prosodic-information generator and a speaking-rate dependent prosodic model builder.

10. The speaking-rate normalized prosodic parameter builder according to any one of the above-mentioned Embodiments, wherein the second prosodic-information generation unit further includes a first functional information unit and a second functional information unit.

11. A speaking-rate dependent prosodic model builder, comprising:

a first input terminal for receiving a first information originating from a first language spoken by a first speaker;

a second input terminal for receiving a second information originating from a second language spoken by a second speaker; and a functional information unit having a function, wherein:
  the function includes one of a first plurality of parameters simultaneously relevant to the first language and the second language, and a plurality of sub-parameters of any one in a second plurality of parameters relevant to the second language alone; and
  the functional information unit, under a maximum a posteriori (MAP) condition, based on the first information, the second information and one of the first plurality of parameters and the plurality of sub-parameters, produces a speaking-rate dependent reference information, and constructs a speaking-rate dependent prosodic model of the second language according to the reference information.

12. The speaking-rate dependent prosodic model builder according to Embodiment 11, wherein:

the first language and the second language are both related to Chinese, and are one selected from a group consisting of Mandarin, Wu, Yue, Minnan, Xiang, Hakka and Gan;

the first information includes a first statistic datum and a speaking-rate dependent prosodic model generated based on a first speaking-rate, a first linguistic parameter and a first prosodic parameter of the first language; and the second information represents a second speaking-rate of the second language spoken by the second speaker, a second linguistic parameter and a third prosodic parameter generated based on a second prosodic parameter.

13. The speaking-rate dependent prosodic model builder according to Embodiment 11 or 12 being configured in a prosodic-information generation device, wherein the prosodic-information generation device further includes a first prosodic-information generation unit, a second prosodic-information generation unit, a prosodic-information generator and a speaking-rate normalized prosodic parameter builder.

14. The speaking-rate dependent prosodic model builder according to any one of the above-mentioned Embodiments, wherein the second prosodic-information generation unit further includes a first functional information unit and a second functional information unit.

According to the descriptions above, the present invention employs a speaking-rate controlled prosodic information generation unit trained by a speech corpus having a large amount of language material of language A originating from a first speaker, as a basis, and to use an adaptive processing technique to combine similar or common characteristics of language and prosody of language A and of language B to accomplish the build-up of a speaking-rate controlled prosodic information generation device and a method for generating language characteristics and speaking style of a second speaker under the condition that only a small amount of speech material of language B of the speaker B is collected, which is both non-obvious and novel.

While the present invention has been described in terms of what are presently considered to be the most practical and preferred embodiments, it is to be understood that the present invention need not be restricted to the disclosed embodiments. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A prosodic-information generation device configured to synthesize second language speech of language content based on first information originating from a first language and prosodic-information of first and second language speech, comprising:

a first prosodic-information generation unit including a first speaking-rate normalized prosodic parameter builder, a first storage and a second storage, configured to generate and output a first statistic datum, a first speaking-rate normalized prosodic parameter model stored in the first storage, a second statistic datum and a first speaking-rate dependent prosodic model of the first language in the second storage, in response to the first information originating from the first language spoken by a first speaker;

a second prosodic-information generation unit including a second speaking-rate normalized prosodic parameter builder, a third storage and a fourth storage, configured to provide a first functional information unit and a second functional information unit, and to generate and output a second speaking-rate normalized prosodic parameter model stored in the third storage and a second speaking-rate dependent prosodic model stored in the fourth storage in response to the first statistic datum, the first speaking-rate normalized prosodic parameter model, the second statistic datum, the first speaking-rate dependent prosodic model and a second information originating from the second language spoken by a second speaker, wherein:

the first functional information unit has a first function including a likelihood function, generates a first plurality of parameters capable of joining a speaking-rate normalization of a pitch contour, a syllable duration and/or a pause duration of the second language in response to the second information, the first statistic datum and the first speaking-rate normalized prosodic parameter model in the first storage, and constructs the second speaking-rate normalized prosodic parameter model of the second language in the third storage according to the first plurality of parameters, where the first function uses a Maximum a Posteriori Linear Regression (MAPLR) algorithm to estimate the first plurality of parameters, and the likelihood function is used to relate among a pitch contour, a syllable duration and/or a pause duration of the first language and those of the second language; and the second functional information unit has a second function including one of a second plurality of parameters simultaneously relate to the first language and the second language, and a plurality of sub-parameters of any one in a third plurality of parameters relevant to the second language alone, in which the first functional information unit, under a maximum a posteriori (MAP) condition, in response to the first information, the second information and one of the second plurality of parameters and the plurality of sub-parameters, produces a speaking-rate dependent reference information so as to construct the second speaking-rate dependent prosodic model of the second language in the fourth storage according to the reference information; and a prosodic-information generator configured to generate a first prosodic parameter of a second language content in response to the second speaking-rate normalized prosodic parameter model in the third storage, the second speaking-rate dependent prosodic model in the fourth storage, and a desired speaking-rate, wherein:

the second plurality of parameters and the third plurality of parameters include a break-syntax model, a prosodic state model, a prosodic state-syntax model, a syllable prosodic-acoustic model and a syllable-juncture prosodic-acoustic model, and the plurality of sub-parameters include several additive factors related to tone, basic syllable type, initial type, coarticulation and prosodic states such that the language content is synthesized in the second language speech using the prosodic-information generator.

2. The prosodic-information generation device according to claim 1, wherein:

the first language and the second language are both related to Chinese, and are one selected from a group consisting of Mandarin, Wu, Yue, Minnan, Xiang, Hakka and Gan;

the prosodic-information generation device achieves to learn the second language from the first language, mimics a speaking style of the second speaker based on a speaking style of the first speaker and controls the desired speaking-rate according to the first function and the second function;

the prosodic-information generation device uses any one of speech synthesizers to synthesize a synthesized speech signal having a transfer capability among different languages, any one of designated speaking-rates, and speaking styles of different speakers;

the first information includes a first speaking-rate of the first language, a first linguistic parameter and a second prosodic parameter;

the second information includes a second speaking-rate of the second language, a second linguistic parameter and a third prosodic parameter;

the second language content desired to be synthesized is a third linguistic parameter of the second language of the second language speech;

the first prosodic-information generation unit executes one of an N-fold sampling algorithm and a decision tree algorithm related to a training sample estimation, based on the first information so as to generate the first statistic datum and the second statistic datum;

the first statistic datum includes a first statistic and a second statistic, wherein the first statistic and the second statistic respectively represent a first mean and a first variance of a tone of the first language; and plural variances of the plurality of sub-parameters are obtained by executing one of the N-fold sampling algorithm and the decision tree algorithm related to the training sample estimation.

3. The prosodic-information generation device according to claim 2, wherein:

the first speaking-rate normalized prosodic parameter builder generates a fourth prosodic parameter, the first statistic datum and the first speaking-rate normalized prosodic parameter model based on the first speaking-rate, the first linguistic parameter and the second prosodic parameter and a first speaking-rate dependent prosodic model builder generating a first prosodic tag, the second statistic datum and the first speaking-rate dependent prosodic model based on the first speaking-rate, the first linguistic parameter and the fourth prosodic parameter;

the second prosodic-information generation unit further includes a second speaking-rate dependent prosodic model builder, wherein the second speaking-rate normalized prosodic parameter builder includes the first functional information unit and the second speaking-rate dependent prosodic model builder includes the second functional information unit;

when a first specific condition is met, the first function uses the MAPLR algorithm to generate the first plurality of parameters for joining a speaking-rate normalization of the pitch contour, the syllable duration and/or the pause duration of the second language, and to remove a first-order and a second-order statistical characteristics of the third prosodic parameter influenced by the second speaking-rate so as to generate a fifth prosodic parameter;

the second speaking-rate normalized prosodic parameter model includes a syllable pitch contour normalized model, a syllable duration normalized model and a pause duration-speaking-rate normalization model originating from the second language spoken by the second speaker, wherein those models respectively remove statistical characteristics in the pitch contour, the syllable duration and the inter-syllable pause duration of the second language influenced by the second speaking-rate;

when the first specific condition is met, the second function uses a MAP condition to generate a speaking-rate dependent reference information based on the first information, the second information, and one of the second plurality of parameters and the plurality of sub-parameters, constructs the second speaking-rate dependent prosodic model and generates a second prosodic tag according to the reference information;

either of the first speaking-rate dependent prosodic model and the second speaking-rate dependent prosodic model includes a break-syntax model, a prosodic state model, a prosodic state-syntax model, a syllable prosodic-acoustic model, a syllable-juncture prosodic-acoustic model of the first language and the second language, wherein the break-syntax model and the prosodic state model are related to a speaking-rate; and the first specific condition includes:
a range of the first speaking-rate of the first language is larger than a range of the second speaking-rate of the second language; and
an amount of parameters of the first linguistic parameter and an amount of parameters of the second prosodic parameter are respectively larger than an amount of parameters of the second linguistic parameter and an amount of parameters of the third prosodic parameter.

4. The prosodic-information generation device according to claim 3, wherein:
the second speaking-rate dependent prosodic model is generated in the range of the second speaking-rate of the second speaker, and is extrapolated out of the range of the second speaking-rate of the second speaker to a prosodic break in language, a prosodic state and a first-order and a second-order statistical characteristics of a speaking-rate normalized prosodic parameter influenced by a speaking-rate, for enabling the prosodic-information generation device to generate the first prosodic parameter having speaking-rate characteristics of the second language speech;
the prosodic break in language has a prosodic structure corresponding to a speaking style of the second speaker at a specific speaking-rate;
a sequence of the prosodic state represents syllable prosodic acoustic characteristics of a prosodic constituent of an upper level corresponding to the speaking style of the second speaker under the generated prosodic structure and a specific speaking-rate; and
the speaking-rate normalized prosodic parameter represents a prosodic parameter having characteristics of the second speaker under a designated speaking-rate and having speaking style of the second speaker.

5. The prosodic-information generation device according to claim 4, wherein:
the first linguistic parameter includes parts of speech, punctuation marks, a word length, a tone, basic syllable types and types of vowel of the first language;
the second linguistic parameter includes parts of speech, punctuation marks, a word length, a tone, basic syllable types and types of vowel of the second language;
the third linguistic parameter includes parts of speech, punctuation marks, a word length, a tone, basic syllable types and types of vowel of the second language;
the first prosodic parameter includes a syllable pitch contour, the syllable duration, a syllable energy level and the pause duration between two syllables of the second language;
the second prosodic parameter includes a syllable pitch contour, the syllable duration, a syllable energy level and the pause duration between two syllables of the first language;
the third prosodic parameter includes the syllable pitch contour, the syllable duration, the syllable energy level and the inter-syllable pause duration of the second language;
the fourth prosodic parameter includes the speaking-rate normalized syllable pitch contour, the syllable duration, the syllable energy level and the inter-syllable pause duration of the first language;
the fifth prosodic parameter includes the speaking-rate normalized syllable pitch contour, the syllable duration, the syllable energy level and the inter-syllable pause duration of the second language;
a first prosodic tag datum includes a sequence of prosodic break tags of the first language of the first speaker, a sequence of a syllable pitch prosodic state, a sequence of syllable duration prosodic state, and a sequence of syllable energy prosodic state; and
a second prosodic tag datum includes a sequence of prosodic break tags of the second language of the second speaker, a sequence of a syllable pitch prosodic state, a sequence of syllable duration prosodic state, and a sequence of syllable energy prosodic state.

6. A prosodic-information generation method for synthesizing second language speech of language content based on first information originating from a first language and prosodic-information of first and second language speech, comprising steps of:
providing the first information originating from the first language spoken by a first speaker and a second information originating from the second language spoken by a second speaker;
generating a first statistic datum, a first speaking-rate normalized prosodic parameter model stored in a first storage, a second statistic datum and a first speaking-rate dependent prosodic model stored in a second storage based on the first information;
providing a first speaking-rate normalized prosodic parameter builder including a first functional information unit, wherein the first functional information unit has a first function including a likelihood function, generates a first plurality of parameters joining a speaking-rate normalization of a pitch contour, a syllable duration and/or a pause duration of the second language based on the second information, the first statistic datum and the first speaking-rate normalized prosodic parameter model and constructs the second speaking-rate normalized prosodic parameter model of the second language in a third storage according to the first plurality of parameters, where the first function uses a Maximum a Posteriori Linear Regression (MAPLR) algorithm to estimate the first plurality of parameters, and the likelihood function relates among a pitch contour, a syllable duration and/or a pause duration of the first language and those of the second language;
providing a first speaking-rate normalized prosodic parameter builder including a second functional information unit which has a second function including one of a second plurality of parameters simultaneously relate to the first language and the second language, and a plurality of sub-parameters of any one in a third plurality of parameters relevant to the second language alone, wherein the first functional information unit, under a maximum a posteriori (MAP) condition, based on the first information, the second information and one of the second plurality of parameters and the plurality of sub-parameters, produces a speaking-rate dependent reference information so as to construct the second speaking-rate dependent prosodic model of the second language in a fourth storage according to the reference information; and
generating a first prosodic parameter of a second language content based on the second speaking-rate normalized prosodic parameter model, the second speaking-rate dependent prosodic model, and a desired speaking-rate, wherein:
the second plurality of parameters and the third plurality of parameters include a break-syntax model, a prosodic state model, a prosodic state-syntax model, a syllable prosodic-acoustic model and a syllable-juncture prosodic-acoustic model, and the plurality of sub-parameters include several additive factors related to tone, basic syllable type, initial type, coarticulation and prosodic states such that the language content is synthesized in the second language speech using the generated parameters.

7. A speaking-rate dependent prosodic model builder configured to synthesize second language speech of language content based on first information originating from a first language and prosodic-information of first and second language speech, comprising:
   a first input terminal for receiving the first information originating from the first language spoken by a first speaker;
   a second input terminal for receiving a second information originating from the second language spoken by a second speaker; and
   a functional information unit having a function, wherein:
   the function includes one of a first plurality of parameters simultaneously relevant to the first language and the second language, and a plurality of sub-parameters of any one in a second plurality of parameters relevant to the second language alone; and
   the functional information unit, under a maximum a posteriori (MAP) condition, based on the first information, the second information and one of the first plurality of parameters and the plurality of sub-parameters, produces a speaking-rate dependent reference information, and constructs a speaking-rate dependent prosodic model of the second language in the storage according to the reference information, wherein:
   the second language is relevant to a plurality of sub-parameters of any one in a third plurality of parameters; and
   the second plurality of parameters and the third plurality of parameters include a break-syntax model, a prosodic state model, a prosodic state-syntax model, a syllable prosodic-acoustic model and a syllable-juncture prosodic-acoustic model, and the plurality of sub-parameters include several additive factors related to tone, basic syllable type, initial type, coarticulation and prosodic states such that the language content is synthesized in the second language speech using the functional information unit.

8. The speaking-rate dependent prosodic model builder according to claim 7, wherein:
   the first language and the second language are both related to Chinese, and are one selected from a group consisting of Mandarin, Wu, Yue, Minnan, Xiang, Hakka and Gan;
   the first information includes a first statistic datum and a speaking-rate dependent prosodic model generated based on a first speaking-rate, a first linguistic parameter and a first prosodic parameter of the first language; and
   the second information represents a second speaking-rate of the second language spoken by the second speaker, a second linguistic parameter and a third prosodic parameter generated based on a second prosodic parameter.

9. The speaking-rate dependent prosodic model builder according to claim 7 being configured in a prosodic-information generation device, wherein the prosodic-information generation device further includes a first prosodic-information generation unit, a second prosodic-information generation unit, a prosodic-information generator and a speaking-rate normalized prosodic parameter builder.

10. The speaking-rate dependent prosodic model builder according to claim 9, wherein the second prosodic-information generation unit further includes a first functional information unit and a second functional information unit.

* * * * *